(12) United States Patent
Herley

(10) Patent No.: US 6,901,167 B2
(45) Date of Patent: May 31, 2005

(54) DETECTING MULTIPLE OBJECTS IN DIGITAL IMAGE DATA

(75) Inventor: Cormac E. Herley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 720 days.

(21) Appl. No.: 09/826,440

(22) Filed: Apr. 4, 2001

(65) Prior Publication Data

US 2002/0146173 A1 Oct. 10, 2002

(51) Int. Cl.[7] .................................................. G06K 9/00
(52) U.S. Cl. ........................................ 382/199; 382/286
(58) Field of Search ............................ 358/1.9; 382/165, 382/170, 173, 199, 224, 281, 228, 225, 201, 202, 203, 273, 286, 141

(56) References Cited

U.S. PATENT DOCUMENTS 5,892,854 A * 4/1999 de Queiroz et al. ........ 382/288
6,157,737 A * 12/2000 Ishikawa et al. ............ 382/195
6,298,172 B1 * 10/2001 Arney et al. ................ 382/293
6,404,936 B1 * 6/2002 Katayama et al. .......... 382/283

* cited by examiner

Primary Examiner—Yon J. Couso
(74) Attorney, Agent, or Firm—Lee & Hayes, PLLC

(57) ABSTRACT

The described subject matter automatically detects the boundaries of multiple objects in digital image data such as scanned image data. To accomplish this, a background color such as a scanner lid background color is detected. An edge map is generated based on a set of transitions between the determined background color and other colors that correspond to the scanned image data. A set of straight lines, or boundaries that correspond to one or more objects in the image data is determined by analyzing the generated edge map. The straight lines are assigned to respective objects based on a set of rules.

25 Claims, 6 Drawing Sheets

DETECTING MULTIPLE OBJECTS IN DIGITAL IMAGE DATA

TECHNICAL FIELD

The following description relates to image processing. More particularly, the following description relates to using image-processing techniques to detect multiple objects in digital image data.

BACKGROUND

Scanners are often used to scan objects such as photographs. These scanned objects can then be used for many different purposes such as incorporation in a Web page, sending to friends and family over electronic mail, and/or the like. Original Equipment Manufacturers (OEMs) and Independent Hardware Vendors (IHVs) typically distribute scanners with image-processing software to simplify a user's scanning experience. Image processing software is typically configured to automatically analyze scanned image data to detect a single scanned object of interest. Upon detecting the single object, the image processing software typically either highlights the detected object with an outline and/or automatically segments the detected object from the scanned image data.

To speed up the scanning process when multiple objects such as photographs need to be scanned, a user will typically place two, three, or more objects at a time onto the scanner's platen. After the multiple objects have been scanned, image processing software, rather than detecting multiple objects in the scanned image data, only typically detects a single large object comprised of the smaller multiple objects. Thus, the user generally needs to manually segment the single large object into several smaller objects to fully represent the multiple objects that were placed on the scanner's platen. Such manual segmenting is typically performed through the use of manual segmenting tools that are distributed with the image processing software. This process can be tedious and timing consuming for the user.

Accordingly, the invention arose out of concerns associated with providing improved systems and methods for scanning objects.

SUMMARY

The described subject matter automatically detects the boundaries of multiple objects in digital image data such as scanned image data. A background color such as a scanner lid background color is detected. An edge map is generated based on a set of transitions between the determined background color and other colors that correspond to the scanned image data. A set of straight lines, or boundaries that correspond to one or more objects in the image data is determined by analyzing the generated edge map. The straight lines are assigned to respective objects based on a set of rules. Thus, scanned image data is automatically segmented based on the detected boundaries into separate image objects—thus, sparing a user the trouble of carrying out the image segmentation by hand.

BRIEF DESCRIPTION OF THE DRAWINGS

FIG. 7 illustrates how a candidate object is detected in image data after a previous object has been detected.

DETAILED DESCRIPTION

The following description sets forth a number of specific implementations to detect multiple objects in digital image data. The subject matter incorporates elements recited in the appended claims. The implementations are described with specificity in order to meet statutory requirements. However, the description itself is not intended to limit the scope of this patent. Rather, it has been contemplated that the claimed subject matter might also be embodied in other ways, to include different elements or combinations of elements similar to the ones described in this document, in conjunction with other present or future technologies.

Exemplary System

Figure 1:
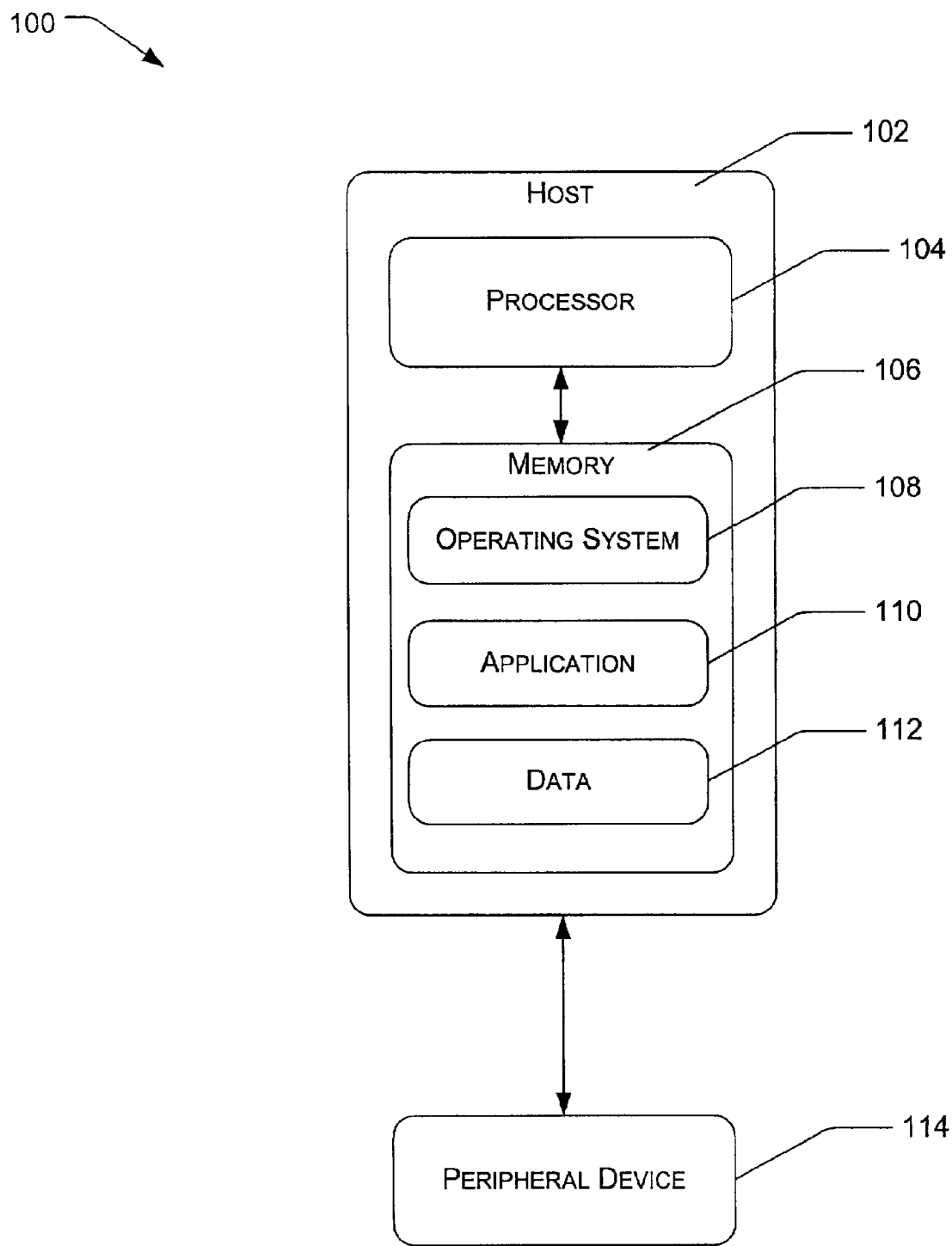
FIG. 1 is a block diagram that shows aspects of an exemplary system to detect multiple objects in image data.

FIG. 1 shows an exemplary system 100 to detect boundaries of multiple objects in image data. System 100 includes a computer 102 connected to a peripheral device 114. The peripheral device 106 can be any type of peripheral device such as a scanner, a digital camera, and the like, that is used to transfer image data to the computer.

Computer 102 has one or more processors 104 and one or more forms of computer-readable memory media 106 such as electronic memory, magnetic storage media, optical storage media, or some other type of data storage. Programs are stored in the memory from where they are executed by the processor. In this example, such programs include a digital image object detection program module 110, and well as an operating system 108 such as a Microsoft WINDOWS® operating system..

The digital image object detection application 110 provides various services such as obtaining digital image data 112, detecting whether the image data includes one or more objects, determining the boundaries of the detected object (s), and optionally segmenting the detected objects based on the determined object boundaries. The image data may be obtained in a number of different ways. For example, image data may be communicated across a network (e.g., e-mail attachments), acquired from a peripheral device 114 such as a scanner, a camera, and/or the like.

In one implementation the peripheral 114 is a scanner. In this implementation, boundaries that correspond to multiple objects in the image date, the system 100 first determines an estimate of a background color of the scanner lid. This can be accomplished by determining a pixel value near the edge of the scanner platen. This can also be accomplished by forming a histogram of the scanned data and seeking a dominant color.

Next, an edge map of the scanned image data is generated. An edge map is an array of elements, wherein each element represents an indication of whether a respective pixel of the image data corresponds to a potential edge in an image such as a photograph. A pixel is considered to be an edge or boundary of an object if the absolute difference between the pixel and the determined background color exceeds a certain threshold. This threshold can be set to some percentage of the dynamic range of the scanner such that a certain distribution of pixel values will qualify as a background color.

For example, consider that a particular scanner outputs pixel values that range from zero (0) to two-hundred-and-fifty-five (255) and the scanner background color is determined to be equivalent to a pixel value of 255. A threshold of four (4) will indicate that pixel values of two-hundred-and-fifty-one (251) to 255 represent a background color. Thus, in this example, a pixel value of 250 may represent an edge. The threshold can be selected such that picture or scanning noise can be accounted for in the background determination. In this implementation, the threshold is adjusted to take into account the difference between the background color and the first pixel of the image. For color images, which generally have three or more color planes such as red, green, and blue channels, the edge locations can be estimated by carrying out this "thresholding" along only one of the color channels, for example along a green channel The generated edge map may be extremely noisy, either missing data or having a number of data that do not correspond to edges. For example, if a scanned photograph includes a transition from a dark horizon to a light colored sky, wherein the sky's color is similar to the background color of the scanner lid, the sky may be represented in the edge map as noise. Thus, the determination of the existence of straight lines from an edge map is prone to substantial error.

A Hough transform of the edge map is taken to determine which of the detected edges correspond to straight lines in the image data. (A Hough transform is a well-known transform used to determine the existence of edges in digital image data). This transform maps every point (x,y) in the edge map to a curve in the ($\rho$(rho), $\theta$ (theta)) space, where rho is the perpendicular distance from some origin of a line at angle theta passing through the point (x,y). Points in the Hough space that are at the intersection of many such curves are points, or "peaks" that correspond to straight lines in the image space. In this manner, straight lines in the image space are determined by identifying those points in Hough space that illustrate clustering, or peaks.

Figure 2:
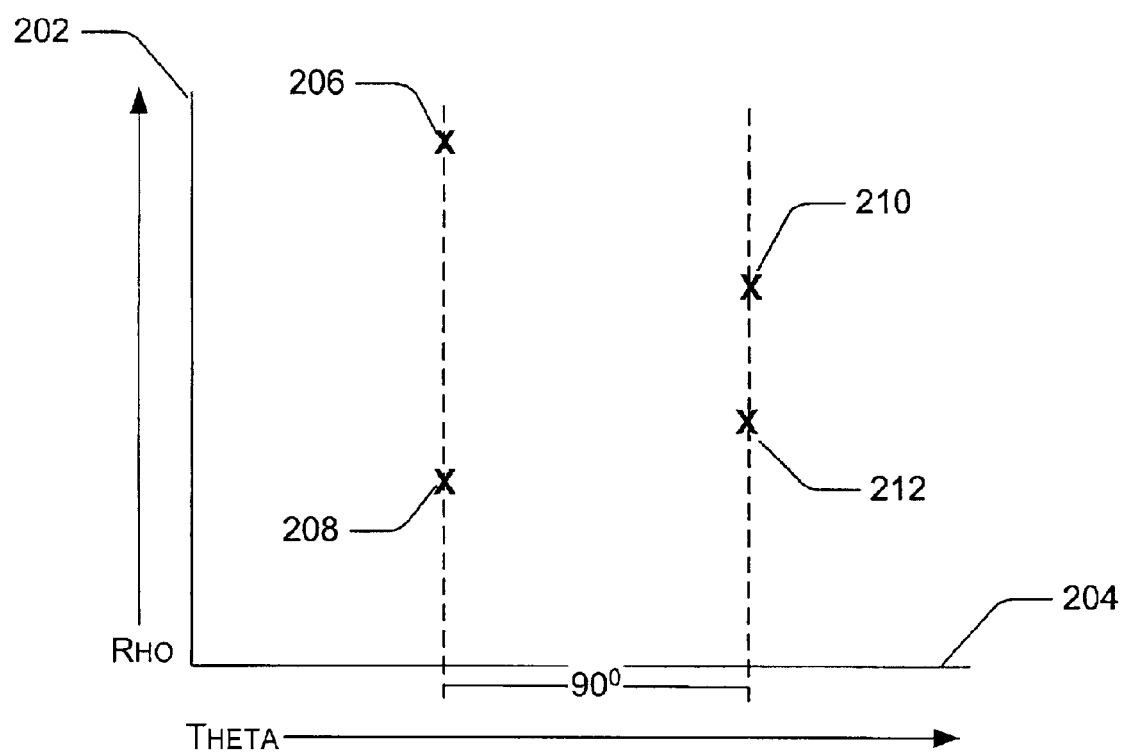
FIG. 2 is a graph that illustrates that peaks in Hough transform space correspond to straight lines.

FIG. 2 is a graph that illustrates that a single rectangular object will produce four (4) peaks in the Hough space. The vertical axis 202 represents the "Rho"coordinates of a point in Hough space. The horizontal axis 204 represents the "Theta" coordinates of a point in Hough space. Peaks having the same theta coordinate such as peak 206 and peak 208 represent parallel lines. (Peak 210 and peak 212 also share a theta coordinate indicating that they are also parallel to one another).

A rectangular object will have a first pair of lines with corresponding theta coordinates that are ninety-degrees apart from the theta coordinates that correspond to a second pair of parallel lines. In this example, two parallel lines respectfully represented by peak 206 and peak 208 have theta values that are ninety-degrees apart from the theta coordinates that correspond to a second pair of parallel lines respectfully represented by peak 210 and peak 212. In this manner, a single rectangular object can be identified using a Hough transform.

One useful property of a Hough transform is that the pixels that define a straight line need not all be contiguous in the image space. This property is very useful when detecting lines with short breaks in them due to noise, or when objects are partially occluded by other objects.

Figure 3:
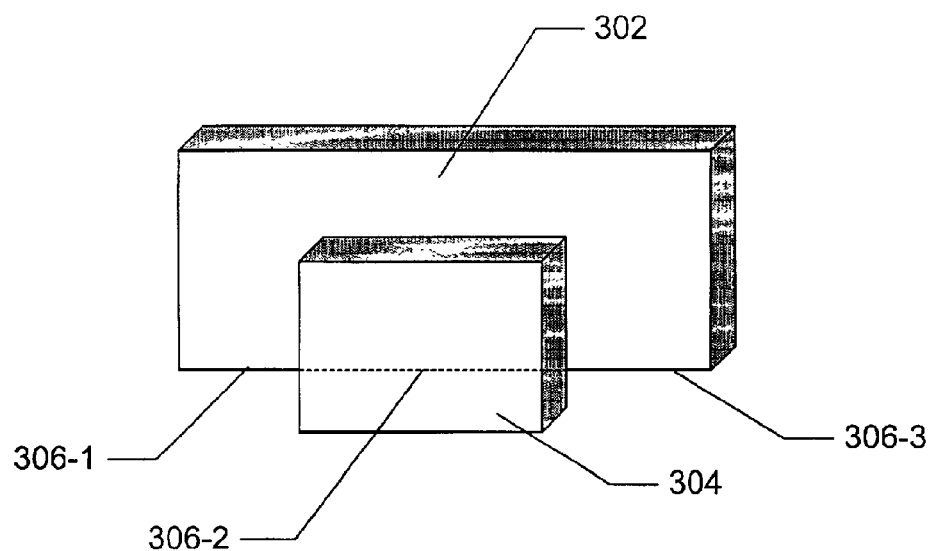
FIG. 3 is a block diagram that shows that all pixels that lie on a line need not all be contiguous to one another to be categorized as belonging to the same line by a Hough transform.

For example, FIG. 3 is a block diagram that shows that all pixels that lie on a line need not all be contiguous to one another to be categorized as belonging to the same line by a Hough transform. Block 302 is partially occluded by block 304. This is evident by the pixels that comprise line segments 306-1 and 306-3. A Hough transform will detect line 306 as comprising each of the following line segments: line segment 306-1, dotted line segment 306-2, and line segment 306-3. Thus, this property of the Hough transform is very useful when detecting lines with short breaks in them due to noise, or when objects are partially occluded by other objects.

However, this property also provides misleading results when objects happen to be aligned on purpose or by chance. This is because one disadvantage of the Hough transform methodology is that it detects infinite lines rather than a finite line segment with two well-defined endpoints.

Figure 4:
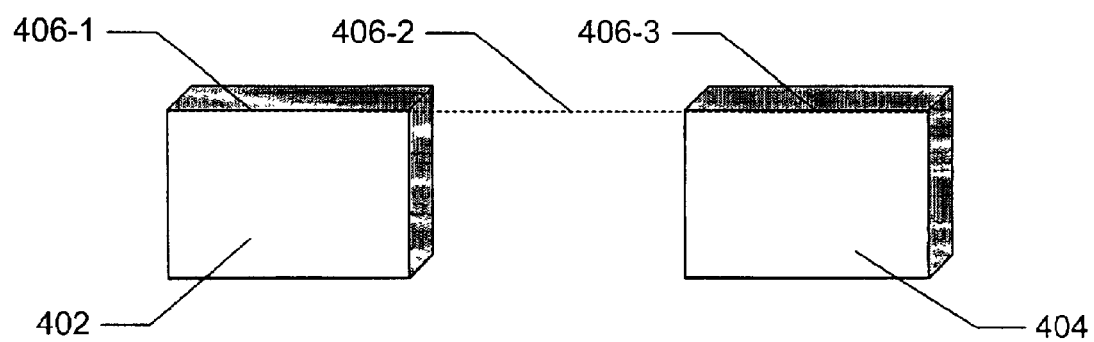
FIG. 4 is a block diagram that shows that a Hough transform will erroneously detect an infinite line rather than a finite line with well defined endpoints if tow or more objects are aligned.

For example, FIG. 4 is a block diagram that illustrates that a Hough transform will erroneously detect an infinite line rather than a finite line with well defined endpoints if two or more objects are aligned. Block 402 is aligned with block 404. With respect a particular one top boundary of the two aligned objects, a Hough transform will indicate that there is a single line 406 that includes the following line segments: dotted line segment 406-1, dotted 406-2, and dotted line segment 406-3. However, the particular one top boundary includes two well defined line segments that include: dotted line segment 406-1 belonging to a boundary of block 402, and dotted line segment 406-3 belonging to a boundary of block 404. Indeed, this shows that one disadvantage of the Hough transform methodology is that it detects infinite lines rather than a finite line segment with two well-defined endpoints.

This misleading property is especially important to consider, because it substantially complicates the determination of which line segments define boundaries for which objects. When scanning more than one photograph at a time, a user will typically align multiple photographs at a same angle with respect to one another on a scanner platen. This means that two or more objects that share the same orientation will typically be represented as the same peak in the Hough transform space. Thus, multiple scanned objects in image data may be detected as sharing an infinite line, and therefore difficult to classify.

In light of the above, two objects that are aligned based on the same orientation can have fewer than eight (8) peaks in the Hough transform space because well-defined aligned lines segments are typically detected as single infinite lines. As discussed above in reference to FIG. 2, a single rectangular object will typically produce four (4) peaks in the Hough space. Thus, two aligned objects may be erroneously classified as a single large object. Moreover, three such aligned objects can have fewer than twelve (12) such peaks, and the like.

Thus, the determination of which of the detected straight lines correspond to which objects is prone to substantial error for the following reasons: (a) the generated edge map may either missing data or may include data that do not correspond to straight lines; (b) if the edge map is noisy, any straight lines that are detected may be erroneously segmented due to missing data; and (c) two or more aligned objects may be detected as sharing infinite lines and thereby classified as a single large object. To account for such substantial error, a number of rules are applied with respect to the straight lines that are determined using the Hough transform of the edge map.

Before describing the rules in more detail, first note that a user will typically scan in similarly sized objects.

Moreover, note that a corollary to the problem of detecting well-defined line segments with respect to aligned objects, is that it is not as difficult to identify which line segments belong to which objects when the each of the objects are oriented at unique angles with respect to one another. This is because such non-aligned objects have distinct and well-defined sets of four peaks in the Hough transform space.

With respect to the set of rules that are applied to determine which of the detected lines belong to which of the one or more objects, lines that are parallel and perpendicular to one another are identified as described above in reference to FIG. 2. Lines that are parallel and perpendicular with respect to one another have peaks in (rho, theta) space with theta coordinates that are respectively zero (0) degrees and ninety (90) degrees apart from one another. Identifying lines with parallel and perpendicular orientations is especially useful because one implementation locates rectangular objects such as photographs in the scanned image data. Moreover, the respective dimensions of any detected objects are used to determine the respective dimensions of any other objects that are not so simply detected because of any confusion as to which lines belong to which object(s).

After determining straight lines by taking a Hough transform of the edge map, if any objects are detected, same sized candidate objects with dimensions that are similar to the detected objects are then sought. This correlates with an assumption that a user will typically scan in similar sized objects. A pair of parallel lines that are a distance $d_1$ apart, where $d_1$ is one of the dimensions of a previously located object, is considered to identify respective boundaries of a candidate object. If another pair of parallel lines, perpendicular to the first pair, are located that are distance $d_2$ apart, where $d_2$ is the other dimension of the previously located object, all four boundaries of the candidate object are considered to have been identified.

In one implementation, upon identifying a line that is a potential boundary of a candidate object after a first object has already been identified, additional checking is performed to determine that the potential boundary does not belong to a feature of the previously identified object. For example an object feature includes a line that includes the image of the object such as a line that separates a sky from a horizon. The additional checking determines if pixel values of the potential boundary and pixel values near the potential boundary coincide with image to background transitions beyond the range of the already identified object. If so, the potential boundary line is considered to represent a valid object boundary line. Otherwise, the line is no longer considered to represent a valid object boundary, but rather a feature of the already identified object. Using this process, the lines of a candidate object are identified.

After lines outlining a candidate object have been identified, it is determined whether the pixel values inside of the candidate object represent substantially image data values and whether the pixel values on the exterior of the candidate object represent the determined background color values. As described, such background data values may correspond to the scanner platen background values. If so, the lines are considered to represent a valid, or "found" object. Otherwise, the lines are not considered to represent a valid object.

In one embodiment, objects are classified in an easy to hard progression. Any line which has a single companion parallel line and a single pair of perpendicular lines is a good candidate for an object at an angle distinct from the other objects in the image. If this candidate object satisfies the tests of having substantially non-background interior pixels it is classified as an object, and it's dimensions are recorded. This technique typically results in the classification of one or more objects. Next, lines which have more than a single companion parallel line, and/or more than a single pair of companion perpendicular lines are examined. Generally the techniques proceed from lines that represented the larger peaks in the Hough transform space to those that represented smaller peaks.

For a given line, a search is made among lines parallel to the given line for lines at a distance that correspond to either of the dimensions of any of the previously found objects. If the search succeeds, a search is performed among lines perpendicular to the given line for pairs of lines that correspond to the other dimension of any of the previously found objects. If a candidate set of four lines is identified that match the dimensions of any previously found object, and if the candidate lines pass the test of having substantially non-background interior pixels, the candidate lines are classified as representing an object. The four lines that bound this object are not deleted from the list of lines—as some of them may also bound other objects.

In this manner, objects that are at distinct angles with respect to one another are identified. Moreover, objects that have the same dimensions as the identified objects at distinct angles are identified. If at the end of this process there are a number of lines that have not been classified as belonging to objects, pairs of the non-classified parallel and perpendicular lines are evaluated to determine if they represent an object with a non-background interior and negligible overlap with the previously found objects.

Exemplary Computer

Figure 5:
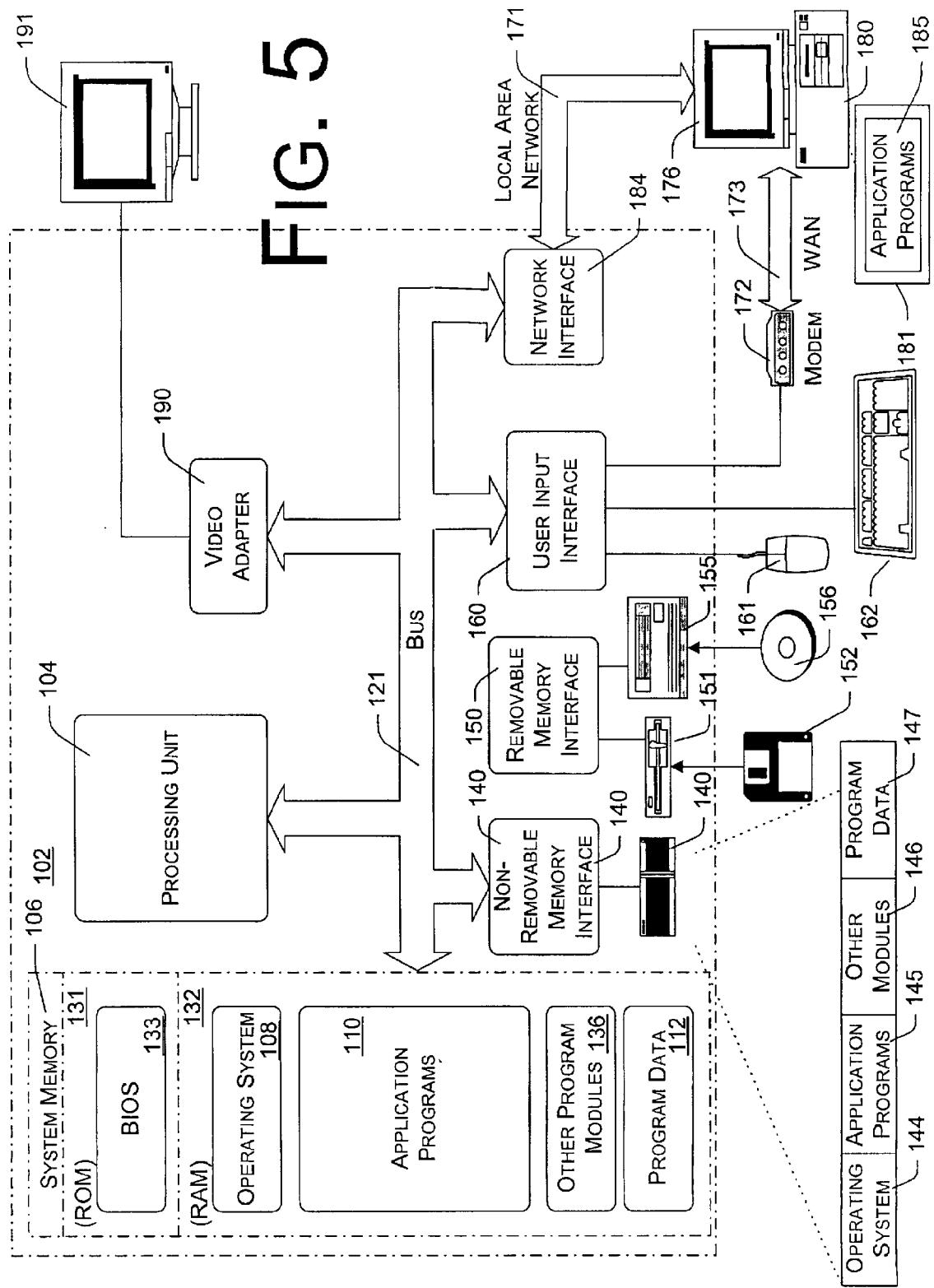
FIG. 5 is a block diagram that shows aspects of an exemplary computer to detect multiple objects in image data.

FIG. 5. shows a computer 102 that forms a suitable environment for the described system 100 of FIG. 1. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 102 may include, but are not limited to, a processing unit 120, a system memory 106, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 102 typically includes a variety of computer-readable media. Computer-readable media can be any available media that can be accessed by computer 102 and includes both volatile and nonvolatile media, removable and non-removable media. By way of example, and not limitation, computer-readable media may include computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 106 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 102, such as during start-up, is typically stored in ROM 131. RAM 132 typically contains data and/or program modules that are immediately accessible to and/or presently being operated on by processing unit 120. By way of example, and not limitation, FIG. 5 illustrates operating system 108, application programs 110, other program modules 136, and program data 112. As is well known, operating systems provide such low-level functions as module (process and dynamic link library) management, scheduling, interprocess messaging, memory management, file system management, and graphical user interface support.

The computer 102 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 5 provide storage of computer-readable instructions, data structures, program modules, and other data for computer 102. In FIG. 5, for example, hard disk drive 141 is illustrated as storing operating system 144, application programs 145, other program modules 146, and program data 147. Note that these components can either be the same as or different from operating system 108, application programs 110, other program modules 136, and program data 112. Operating system 144, application programs 145, other program modules 146, and program data 147 are given different numbers here to illustrate that, at a minimum, they are different copies. A user may enter commands and information into the computer 102 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 102, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 102 is connected to the LAN 171 through a network interface or adapter 170. When used in a WAN networking environment, the computer 102 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 102, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Exemplary Procedure

Figure 6:
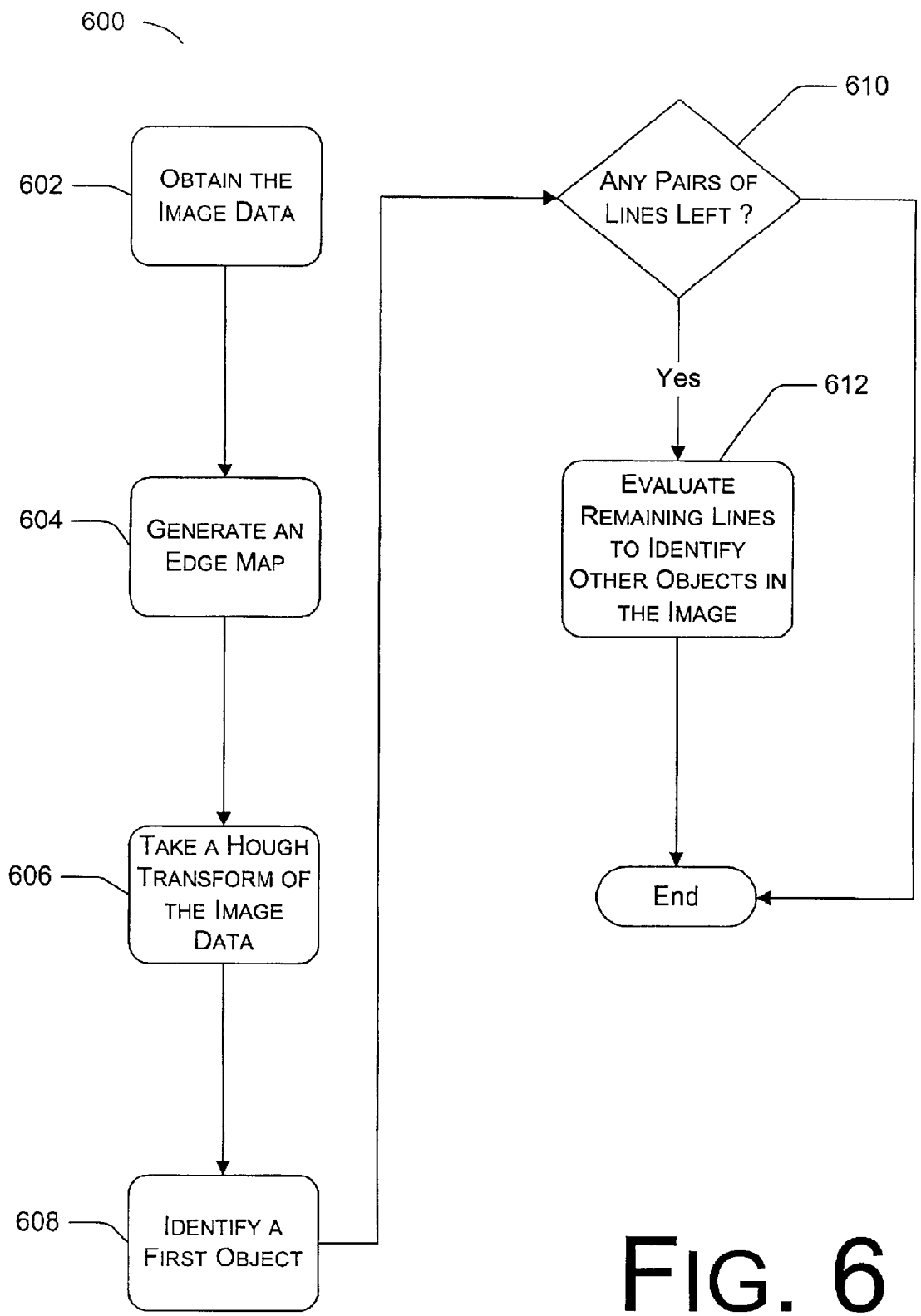
FIG. 6 is a block diagram that shows aspects of an exemplary procedure to detect multiple objects in image data.

FIG. 6 illustrates an exemplary procedure 600 to detect the boundaries of multiple objects in image data. At block 602, the procedure obtains the image data. Step 604 generates an edge map from the image data. At block 606, the procedure takes a Hough transform of the edge map to produce a set of domain peaks, each domain peak corresponds to a straight line of an object in the image data. At block 608, the procedure identifies a first object with a first dimension based on the set of domain peaks.

At block 610, the procedure determines if there are any line pairs remaining. At block 612, the procedure evaluates the remaining lines to identify any other objects in the image. This is accomplished by identifying (a) line sets that indicate an object at a distinct angle as compared to an orientation of a previously found object (e.g., block 608), (b) lines sets that indicate an object having a same dimension as a previously found object, and (c) pairs of parallel and perpendicular lines indicating an object that satisfies a substantially non-background interior condition and a negligible overlap condition with a previously found object.

Figure 7:
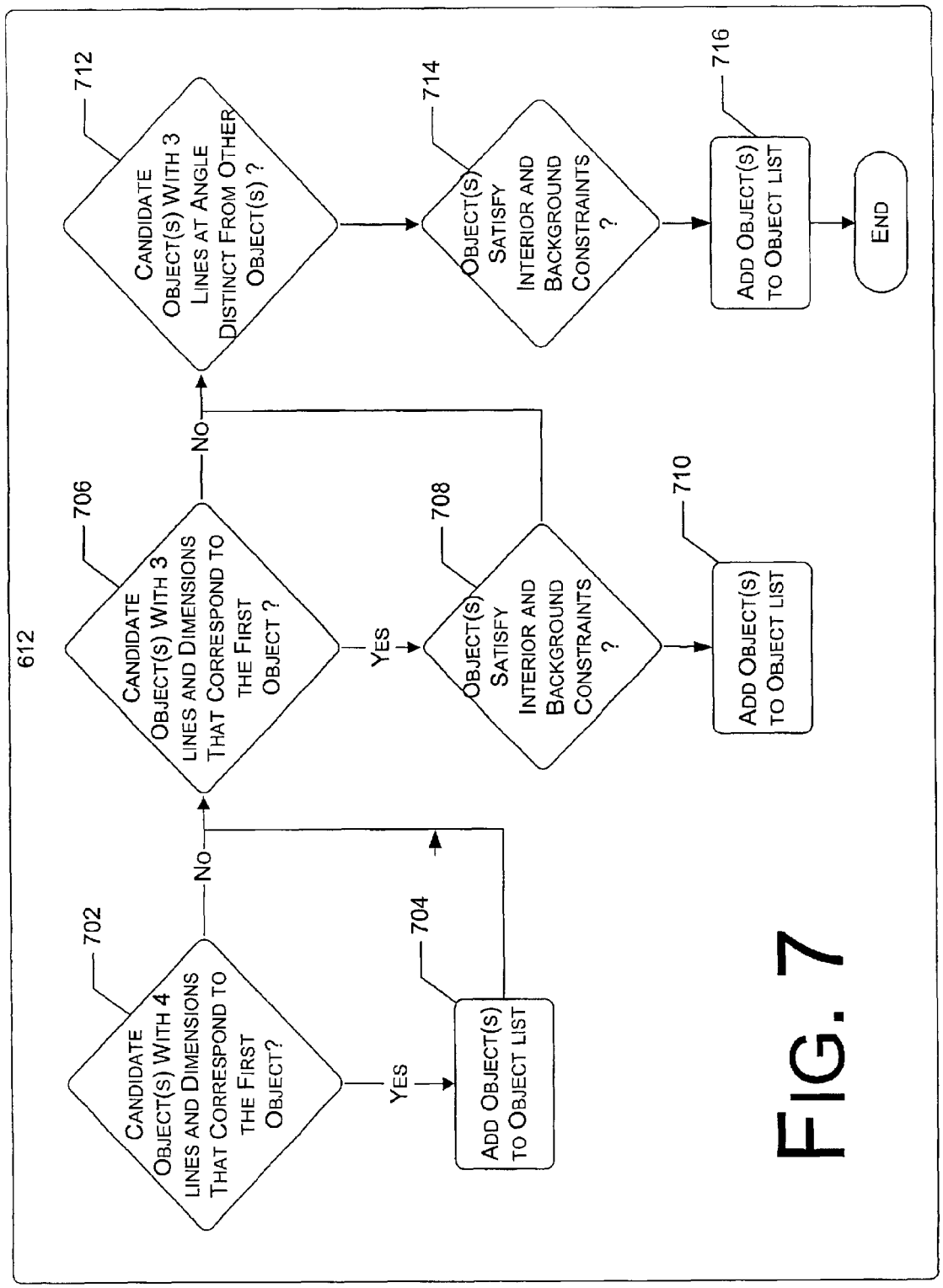
FIG. 7 is a block diagram that shows other aspects of an exemplary procedure to detect multiple objects in image data. Specifically.

FIG. 7 is a block diagram that shows further aspects of an exemplary procedure 700 to detect multiple objects in image data. Specifically, FIG. 7 illustrates more details of block 612 if FIG. 6. At block 702, the procedure determines if there is a candidate object(s) having four (4) lines and dimensions that correspond to a previously found object (e.g., see, block 608, FIG. 6). If so, at block 704, the procedure classifies the candidate object(s) as a found object by adding it to a list of objects identified in the image data.

At block 706, the procedure 700 determines if there is a candidate object having three (3) lines and dimensions that correspond to a previously found object (e.g., see, block 608, FIG. 6, and block 704). If so, at block 708, the procedure determines if the candidate object(s) satisfy the image interior and background color constraints that are described in greater detail above. If so, at block 710, the procedure classifies the candidate object(s) as a found object by adding it to a list of objects identified in the image data.

At block 712, the procedure 700 determines if there is a candidate object having three (3) lines that is at an angle that is distinct from a previously found object (e.g., see, block 608, FIG. 6, block 704, and block 710). If so, at block 714, the procedure determines if the candidate object(s) satisfy the image interior and background color constraints that are described in greater detail above. If so, at block 716, the procedure classifies the candidate object(s) as a found object by adding it to a list of objects identified in the image data. In this manner the procedure evaluates a candidate object to determine if the candidate object represents an object in the image.

Alternative Embodiments

The Hough transform is computationally expensive with respect to both the amount of processing time and processing power that is required to analyze image data to detect straight lines. There is a possibility that a user will only scan a single object. While the above described procedure will determine that there is only a single object represented by image data by locating only four peaks in the Hough transform space, a less computationally expensive way to determine that the image data only represents a single object is desired. Thus, one implementation avoids such expensive processor computations by providing a lightweight procedure to first determine whether more than a single object is represented by image data without needing to transform the edge map data into Hough space.

To accomplish this, transitions between the background and the image data and between the image data and the background are determined while generating the edge map. On the I-th row, the first transition between the background and the image data is called left(i). The last transition between the image data and the background is called right(i). On the J-th column, the first transition from top to bottom between the background and the image data is called top(j). The last transition between the image data and the background data is called bottom(j). Respective histograms that represent the differences between right(i) minus left(i) and top(j) minus bottom(j) are generated.

Next, the generated histograms are analyzed to identify certain characteristics such as well-defined peaks or clusters of data. A determination is made as to whether the image data includes one or more objects based on these identified characteristics.

For example:
  If the histograms include only a single peak, the image data represents only a single object. (These dimensions may not be perfectly horizontal and/or vertical).
  If the histograms include only two peaks, the image data represents multiple objects.
  If there is a gap in either the first histogram or the second histogram, then the image data represents multiple objects. A gap is the absence of color transition in either the horizontal or vertical dimension.
  If neither (a), (b), or (c) apply, the image data represents multiple objects.

The above described criteria, or "rules" provide a way to make a rapid determination of whether image data includes more than a single object without transforming the edge map into Hough transform space. These rules are conservative in that they will almost never result in image data that includes multiple objects being classified as including only a single object, while occasionally classifying such image data as containing a single object. This is considered to be a good tradeoff because the consequences of misclassification in the former case are that a user must then manually designate the objects to be segmented. Whereas, misclassification in the latter case is merely the expenditure of some excess computation (such computation is represented by blocks 610 and 612 of FIG. 6, and blocks 702–716 of FIG. 7) to determine which line segments belong to which object(s).

In this manner, inventive subject matter detects whether image data such as scanned image data includes multiple objects. Regardless of whether one object or more than one object in the image data is detected, the described systems and procedures determine each respective object boundary. These determined boundaries can be used by image processing software to automatically segment the detected objects from the image data. Thus, a user that places multiple objects onto a scanner platen for scanning may not be required to manually segment the multiple objects from a single larger object.

Conclusion

Traditional image processing techniques typically detect only a single large object upon scanning multiple objects that are placed on a scanner platen. Thus, such traditional systems and procedures do not generally provide for the automatic segmentation of multiple objects from scanned image data. Rather, traditional techniques, after automatically detecting a single object, generally require a user to perform manual segmentation of image data to segment any additional objects from the scanned image data. In contrast to such traditional image processing techniques, the described subject matter automatically detects boundaries of multiple objects in image data, identifies one or more objects based on the detected boundaries, and segments the one or more identified objects from the image data. This is done automatically, without requiring a user to manually segment out the separate objects from the image data by hand.

Although the subject matter has been described in language specific to structural features and/or methodological steps, it is to be understood that the subject matter defined in the appended claims is not necessarily limited to the specific features or steps described. Rather, the specific features and steps are disclosed as preferred forms of implementing the claimed subject matter.

What is claimed is:

1. A method for detecting one or more objects in image data, the method comprising:
   generating an edge map from the image data, the edge map comprising an array of elements, each element representing a respective pixel of the image data;
   analyzing the edge map to determine a plurality of boundaries of the one or more objects by:
   (a) transforming the array of elements to produce a set of domain peaks, each domain peak corresponding to a straight line of a set of straight lines, and
   (b) determining which of the straight lines belong to the set of boundaries based on a set rules, the set of rules:
      identifying a boundary set that indicates an object at a distinct angle as compared to an orientation of a previously found object;
      identifying a boundary set that indicates an object having a same dimension as a previously found object; and
      identifying pairs of parallel and perpendicular boundaries that indicate an object that satisfies a substantially non-background interior condition with a previously found object.

2. A method as recited in claim 1, wherein the one or more objects are photographs.

3. A method as recited in claim 1, wherein the one or more objects are rectangular in shape.

4. A method as recited in claim 1, further comprising segmenting the one or more objects based on the set of boundaries.

5. A method as recited in claim 1, wherein the generating further comprises:
   estimating a background color of a scanner lid;
   for each pixel of at least one subset of the image data:
   identifying an absolute difference between a value of a current pixel and the background color; and
   if the absolute difference is greater than a predetermined threshold, indicating that a corresponding array element represents a pixel of the at least one subset of image data that belongs to an edge.

6. A method for detecting one or more objects in image data, the computing device comprising:
   generating an edge map from the image data, the edge map comprising an array of elements, each element representing a respective pixel of the image data; and
   analyzing the edge map to determine a plurality of boundaries of the one or more objects by:
   (a) transforming the array elements to produce a set of domain peaks, each domain peak corresponding to a straight line of a set of straight lines; and
   (b) determining which of the straight lines belong to the set of boundaries based on a set of rules, the set of rules comprising rules that are directed to:
   identifying a first object with a first dimension; and
   seeking a same sized object with a second dimension that corresponds to the first dimension.

7. A method as recited by claim 6, wherein the identifying comprises:
   determining a background color;
   determining a candidate object; and
   if an interior portion of the candidate object is not consistent with the background color, concluding that the candidate object is the first object.

8. A method as recited in claim 6, wherein a line of the straight lines corresponds to a candidate object, the seeking further comprising:
   detecting a first image to background transition that corresponds to the first image, and a second image to background transition that corresponds to the line; and
   if the first image to background transition does not coincide with the second image to background transition, assigning the line to be a boundary of a different object.

9. A method for detecting whether image data represents more than one object the method comprising:
   determining a background color of a scanner lid;
   identifying a set of transitions between the background color and other colors that correspond to the image according to the following:
   (a) for each row(i) of image data:
      calculating a left(i) transition from background data to image data;
      calculating a right(i) transition from image data to background data; and
      determining a difference(i) between right(i) transition and left(i) transition;
   (b) for each column(j) of image data:
      calculating a top(j) transition from background data to image data;
      calculating a bottom(j) transition from image data to background data;
      determining a difference(j) between bottom(j) transition and top(j) transition;
      generating a first histogram from each difference(i);
      generating a second histogram from each difference (J); and
      using a set of characteristics that are displayed by the first and second histograms display to determine whether the image data represents one objects or more than one object;
   analyzing the set of transitions to detect a set of image data characteristics; and
   estimating based on a set of one or more rules, a number of objects based on the set of image data characteristics.

10. A computer-readable medium comprising computer-program instructions executable by a processor for detecting whether image data represents more than one object, the computer-program instructions comprising instructions for:

determining a background color of a scanner lid;
identifying a set of transitions between the background color and other colors that correspond to the image data; and
analyzing the set of transitions to detect a set of image data characteristics;
estimating based on a set of one or more rules, a number of objects based on the set of image data characteristics;
generating a first histogram representing horizontal transitions from the transitions;
generating a second histogram representing vertical transitions from the transitions;
the first and second histograms displaying a set of peaks that identify whether the image data comprises more than one object; and
the set of rules comprising the following rules:
(a) if the set of peaks comprises only a single peak, classifying the image data as containing only a single object;
(b) if the set of peaks comprises only two peaks, classifying the image data as containing multiple objects;
(c) classifying the image data as comprising multiple objects if there is a gap in either the first histogram or the second histogram; and
(d) if neither (a), (b), or (c) apply, classifying the image data as comprising multiple objects.

11. A device for detecting multiple objects in image data, the device comprising:
a processor; and
a memory coupled to the processor, the memory comprising computer program instructions executable by the processor for:
generating an edge map from the image data;
analyzing the edge map to determine a set of boundaries of the one or more objects by:
(a) determining a set of transitions between the set of boundaries and a background color;
(b) identifying a set of characteristics from the set of transitions, the set of characteristics being used to indicate whether the image data comprises a single object or whether the image data comprises a plurality of objects; and
(c) if the image data corresponds to a plurality of objects, assigning particular ones of the set of boundaries to particular ones of the plurality of objects based on a set of rules; and
segmenting the one or more objects based on the set of boundaries.

12. A device as recited in claim 11, wherein the analyzing further comprises taking a Hough transform of the edge map to determine the set of boundaries.

13. A device as recited in claim 11, wherein the set of rules comprises rules that are directed to:
determining a background color of a scanner lid;
determining a candidate object;
determining that the candidate object is a first object, the first object having a first dimension if an interior portion of the candidate object is not consistent with the background color; and
seeking a same sized object with a second dimension that corresponds to the first dimension.

14. A device as recited in claim 11, wherein the set of rules comprises rules that are directed to:
determining a background color of a scanner lid;
determining a first candidate object;
if an interior portion of the first candidate object is not consistent with the background color, determining that the first candidate object is a first object, the first object having a first dimension; and
seeking a same sized object with a second dimension that corresponds to the first dimension, the seeking comprising:
identifying a boundary of the set of boundaries that corresponds to a second candidate object;
detecting a first image to background transition that corresponds to the first object, and a second image to background transition that corresponds to the boundary; and
if the first image to background transition does not coincide with the second image to background transition, assigning the boundary to the same sized object.

15. A device as recited in claim 11, wherein the identifying further comprises:
for each row(i) of image data:
calculating a left(i) transition from background data to image data;
calculating a right(i) transition from image data to background data;
determine a difference(i) between right(i) transition and left(i) transition;
for each column(j) of image data:
calculating a top(j) transition from background data to image data;
calculating a bottom(j) transition from image data to background data;
determine a difference(j) between bottom(j) transition and top(i) transition;
generating a first histogram from each difference(i);
generating a second histogram from each difference(j); and
wherein the first and second histograms display the set of characteristics.

16. A device as recited in claim 11, wherein the set of rules is a first set of rules, and wherein the set of characteristics indicate a set of peaks that are used to identify whether the image data comprises a single object or a plurality of objects based on a second set of rules, the second set of rules comprising rules that are directed to:
(a) if the set of peaks comprises only a single peak, classifying the image data as containing only a single object;
(b) if the set of peaks comprises only two peaks, classifying the image data as containing a plurality of objects;
(c) if there is a gap in either the first histogram or the second histogram, then classifying the image data as comprising containing a plurality of objects; and
(d) if neither (a), (b), or (c) apply, classifying the image data as comprising containing a plurality of objects.

17. A computer readable storage medium comprising as program module for detecting multiple objects in image data, wherein the program module performs acts comprising:
generating an edge map from the image data; the edge map including an array of elements, each element representing a respective pixel of the image data; and analyzing the edge map to determine a set of boundaries of the one more objects by:
  transforming the elements to produce a set of domain peaks, each domain peak corresponding to a straight line of a set of straight lines; and
  determining which of the straight lines belong to the set of boundaries based on a set of rules, the set of rules comprising rules that are directed to:
  identifying a first object with a first dimension; and
  seeking a same sized object with a second dimension that corresponds to the first dimension.

18. A computer readable storage medium as recited in claim 17, wherein the one or more objects are photographs.

19. A computer readable storage medium as recited in claim 17, wherein the one or more objects are rectangular in shape.

20. A computer readable storage medium as recited in claim 17, wherein the program module further performs acts comprising segmenting the one or more objects based on the set of boundaries.

21. A computer readable storage medium as recited in claim 17, wherein the edge map comprises an array of elements, each element representing a respective pixel of the image data; and
  wherein the generating further comprises:
    estimating a background color of a scanner lid;
    for each pixel of the image data:
      identifying an absolute difference between a value of the pixel and the background color; and
      if the absolute difference is greater than a predetermined threshold, indicating that a corresponding array element represents a pixel of the image data that belongs to an edge.

22. A computer readable storage medium as recited in claim 17, wherein the transforming further comprises taking a Hough transform of the array of elements to produce the set of domain peaks.

23. A computer readable storage medium as recited in claim 17, wherein the identifying comprises:
  determining a background color of a scanner lid;
  determining a candidate object; and
  if an interior portion of the candidate object is not consistent with the background color, concluding that the candidate object is the first object.

24. A computer readable storage medium as recited in claim 17, wherein a line of the straight lines corresponds to a candidate object, the seeking further comprising:
  detecting a first image to background transition that corresponds to the first image, and a second image to background transition that corresponds to the line; and
  if the first image to background transition does not coincide with the second image to background transition, assigning the line to be a boundary of a different object.

25. A computer comprising one or more computer-readable media as recited in claim 17.

* * * * *